US012611062B2

(12) United States Patent
Lamothe et al.

(10) Patent No.: US 12,611,062 B2
(45) Date of Patent: Apr. 28, 2026

(54) FOLDABLE PORTABLE DEVICE HOLDER

(71) Applicant: Purple Box, LLC, Philadelphia, PA (US)

(72) Inventors: Christopher Sean Lamothe, Philadelphia, PA (US); Ramon Morell, East Brunswick, NJ (US)

(73) Assignee: Purple Box, LLC, Philadelphia, PA (US)

( * ) Notice: Subject to any disclaimer, the term of this patent is extended or adjusted under 35 U.S.C. 154(b) by 0 days.

(21) Appl. No.: 18/178,279

(22) Filed: Mar. 3, 2023

(65) Prior Publication Data

US 2023/0276971 A1 Sep. 7, 2023

Related U.S. Application Data

(60) Provisional application No. 63/316,255, filed on Mar. 3, 2022.

(51) Int. Cl.
*A47G 23/032* (2006.01)
*F16M 11/38* (2006.01)

(52) U.S. Cl.
CPC ........... *A47G 23/032* (2013.01); *F16M 11/38* (2013.01)

(58) Field of Classification Search
CPC ......... A47G 23/032; F16M 11/38; A47F 5/10; A47F 5/112; A47F 5/11; H04M 1/04; H04M 1/11; A47B 2200/0019
USPC .................................................. 248/174, 459
See application file for complete search history.

(56) References Cited

U.S. PATENT DOCUMENTS

| | | | | | |
|---|---|---|---|---|---|
| 274,052 | A | * | 3/1883 | Taylor .................. | A47B 23/042 |
| | | | | | 248/459 |
| 773,177 | A | * | 10/1904 | Wilson ................. | A47B 23/042 |
| | | | | | 248/459 |
| 809,785 | A | * | 1/1906 | Dahlberg ............. | A47B 23/042 |
| | | | | | 248/459 |
| 1,120,239 | A | * | 12/1914 | Prigge ................. | A47B 23/042 |
| | | | | | 248/459 |
| 1,134,802 | A | * | 4/1915 | Agar .................... | A47B 23/042 |
| | | | | | 248/459 |
| 1,135,874 | A | * | 4/1915 | Bittner ................. | A47B 23/042 |
| | | | | | 248/459 |
| 1,247,275 | A | * | 11/1917 | Hunziker ............. | A47B 23/042 |
| | | | | | 248/459 |

(Continued)

FOREIGN PATENT DOCUMENTS

JP D1691077 7/2021

OTHER PUBLICATIONS

International Search Report and Written Opinion for PCT/US23/63702 dated Oct. 20, 2023, 12 pages.

(Continued)

*Primary Examiner* — Christopher Garft

(74) *Attorney, Agent, or Firm* — Fox Rothschild LLP

(57) ABSTRACT

This document discloses a foldable device holder transitionable between a first flat position and a second folded position that forms a region sized and shaped to receive a device. The foldable device holder can include a body comprising a sheet material; a hinged cutout; a first hinge line defining a first edge of the hinged cutout; a second hinge line; and a third hinge line. When the body is folded along the hinge lines, the foldable device holder can be transitioned into the second position.

16 Claims, 19 Drawing Sheets

(56) References Cited

U.S. PATENT DOCUMENTS

| | | | | |
|---|---|---|---|---|
| 1,391,479 A * | 9/1921 | Kazanjian | A47B 97/08 | 248/174 |
| 1,439,719 A * | 12/1922 | Whipple | A47F 5/112 | 248/459 |
| 1,675,060 A * | 6/1928 | Simmons | B41J 29/15 | 248/459 |
| 1,717,456 A * | 6/1929 | Lasher, Jr. | A47F 5/112 | 211/73 |
| 1,821,025 A * | 9/1931 | Ohlson | G09F 1/04 | 248/174 |
| 1,886,532 A * | 11/1932 | Davidson | A47F 5/116 | 248/174 |
| 2,114,528 A * | 4/1938 | Ghiselin | G09F 5/00 | 248/459 |
| 2,146,702 A * | 2/1939 | Botham | G09F 3/20 | 248/459 |
| 2,299,829 A * | 10/1942 | Feddersen | G10G 5/00 | 248/450 |
| 2,723,820 A * | 11/1955 | Schulz | G09F 1/06 | 211/73 |
| 3,447,770 A * | 6/1969 | Gallamos | A47B 23/043 | 248/459 |
| 3,508,734 A * | 4/1970 | Thomas | G09F 15/0068 | 248/459 |
| 4,674,724 A * | 6/1987 | Gaudet | A47B 23/044 | 248/459 |
| 5,405,019 A * | 4/1995 | Cross | A47B 65/10 | 211/70.1 |
| 6,382,581 B1 * | 5/2002 | Duff | A47B 97/08 | 248/459 |
| D643,223 S | 8/2011 | Harding | | |
| D673,157 S | 12/2012 | Lu et al. | | |
| D674,396 S | 1/2013 | Yang et al. | | |
| 8,424,831 B2 * | 4/2013 | Lin | F16M 13/00 | 248/446 |
| 8,679,065 B2 * | 3/2014 | Schuman | G09F 3/205 | 248/459 |
| D708,839 S | 7/2014 | Lee | | |
| 8,950,720 B1 * | 2/2015 | Carr | F16M 11/38 | 248/460 |
| D754,459 S | 4/2016 | Wilton | | |
| 9,308,767 B1 * | 4/2016 | Waldron | B42D 15/042 | |
| 9,364,081 B1 * | 6/2016 | Haymond | A47B 23/044 | |
| D771,615 S | 11/2016 | Pignotti | | |
| D805,519 S | 12/2017 | Diebel et al. | | |
| 9,901,204 B1 * | 2/2018 | Johnson | F16M 11/38 | |
| D811,753 S * | 3/2018 | Conrad | D6/310 | |
| 9,942,998 B1 * | 4/2018 | Mayes | G06F 1/1633 | |
| 10,265,993 B1 * | 4/2019 | Rusinque | F16M 11/041 | |
| 10,750,884 B2 * | 8/2020 | Hansen | A63C 17/0006 | |
| D949,870 S | 4/2022 | Bibby et al. | | |
| D967,117 S | 10/2022 | Balvidares | | |
| 2008/0187710 A1 * | 8/2008 | Stanchfield | B32B 21/04 | 428/542.2 |
| 2012/0034954 A1 | 2/2012 | Tabe | | |
| 2012/0211631 A1 * | 8/2012 | Lu | F16M 11/38 | 248/371 |
| 2013/0026329 A1 * | 1/2013 | Lane | A47B 23/043 | 248/459 |
| 2013/0036635 A1 * | 2/2013 | Mayer | G09F 9/30 | 40/124.06 |
| 2013/0165188 A1 * | 6/2013 | Carney | H04M 1/0202 | 455/575.1 |
| 2013/0256497 A1 * | 10/2013 | Radmard | F16M 11/10 | 248/167 |
| 2014/0203160 A1 * | 7/2014 | Kelsey | A47G 23/032 | 248/459 |
| 2015/0034781 A1 * | 2/2015 | Kim | G06F 1/16 | 248/174 |
| 2015/0176756 A1 * | 6/2015 | Adams | F16M 13/00 | 248/346.03 |
| 2016/0069508 A1 * | 3/2016 | Haymond | F16M 13/00 | 29/857 |
| 2016/0338487 A1 * | 11/2016 | McGrane | F16M 13/00 | |
| 2017/0230489 A1 * | 8/2017 | Date | F16M 11/041 | |
| 2018/0049549 A1 * | 2/2018 | Conrad | A47F 5/112 | |
| 2018/0078068 A1 * | 3/2018 | Cronin | B65D 5/5206 | |
| 2019/0092550 A1 * | 3/2019 | Gomez | A23B 7/154 | |
| 2022/0117222 A1 * | 4/2022 | Berthiaume | A01N 59/16 | |
| 2023/0276971 A1 * | 9/2023 | Lamothe | A47G 23/0306 | 248/174 |

OTHER PUBLICATIONS

Moxyo, "Portable Phone Stand," retreived on Oct. 28, 2024 from URL: <https://www.moxyo.com/portable-foldable-phone-stand.html>.

* cited by examiner

FOLDABLE PORTABLE DEVICE HOLDER

CROSS-REFERENCE TO RELATED APPLICATION

This application claims the benefit of priority to U.S. Provisional Patent Application No. 63/316,255 filed on Mar. 3, 2022, the disclosure of which is hereby incorporated by reference in its entirety.

BACKGROUND

The present disclosure is directed to one or more foldable portable device holders and one or more foldable systems and/or methods for displaying printed indicia and/or digital media. Restaurants, bars, casinos, etc. often offer coasters to their patrons to protect tables and bars from condensation from beverages placed on them. With the emergence of smartphones and other portable electronic devices, patrons typically have a portable electronic device with them, but do not have anywhere to place it or hold it on the table. Restaurants want to protect their tables, but also can benefit from any additional advertisement space. This patent document describes a device that addresses at least some of the issues described above by providing a portable device holder that is transitionable from a first flat position in which it can be used as coaster.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one or more embodiments, a foldable device holder is provided including a body comprising a sheet material, a hinged cutout, a first hinge line defining a first edge of the hinged cutout, a second hinge line, and a third hinge line. The foldable device holder can be configurable between a first position and a second position: when in the first position the foldable device holder can be flat and when in the second position the foldable device holder can be bent along each of the first, second, and third hinge lines and the hinged cutout forms a region sized and shaped to receive a device.

In one or more embodiments, a foldable beverage coaster is provided that is configurable between a first flat position for receiving a beverage and a second position in which the coaster is folded and forms a shelf sized and shaped to receive a portable electronic device. The foldable beverage coaster can be a planar substantially square shape having an outer dimension between about 3 inches to about 5 inches.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value. Herein, the term "about" when applied to a value generally means within the tolerance range of the equipment used to produce the value, or in some examples, means plus or minus 10%, or plus or minus 5%, or plus or minus 1%, unless otherwise expressly specified. Where a numerical limit or range is stated, the endpoints are included. Also, all values and subranges within a numerical limit or range are specifically included as if explicitly written out. Moreover, examples herein are intended to be illustrative only and are presented for discussion purposes and not by way of limitation.

Figure 1:
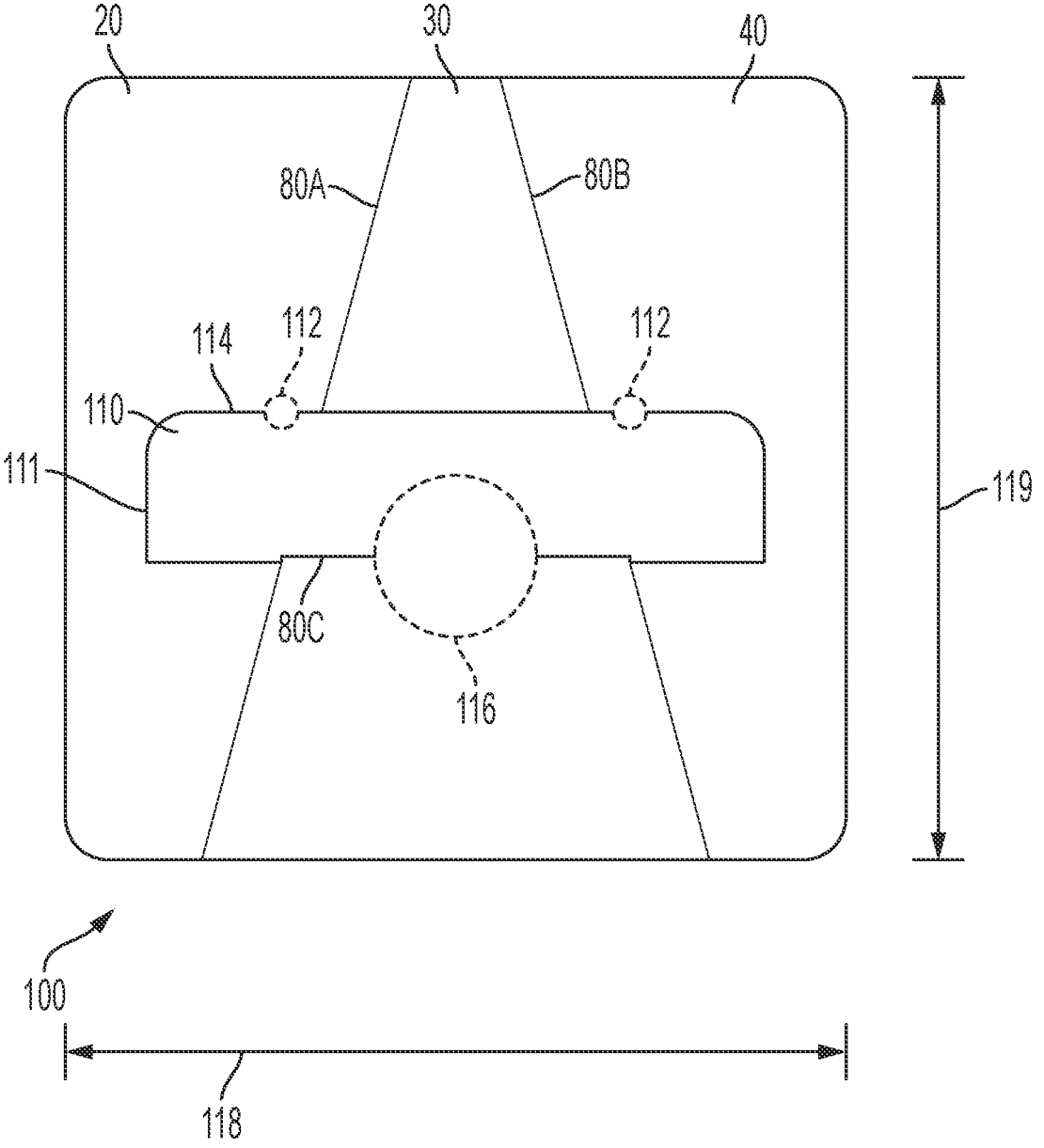
FIG. 1 is a top view of a foldable device holder or system in a flat position, according to one or more examples of the disclosure.
Figure 7:
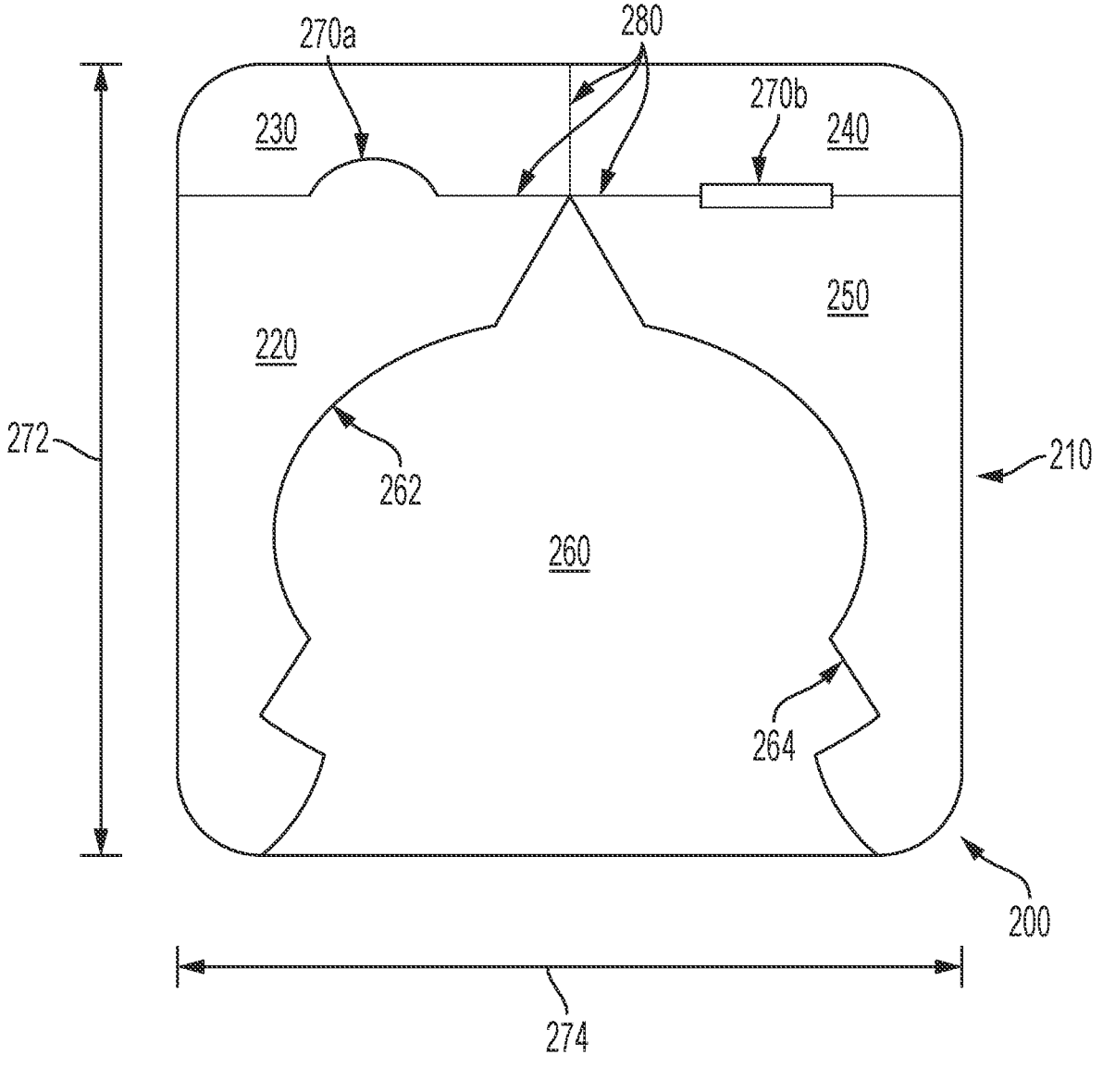
FIG. 7 is a top view of another embodiment of a foldable device holder or system in a flat position, according to one or more examples of the disclosure.
Figure 11:
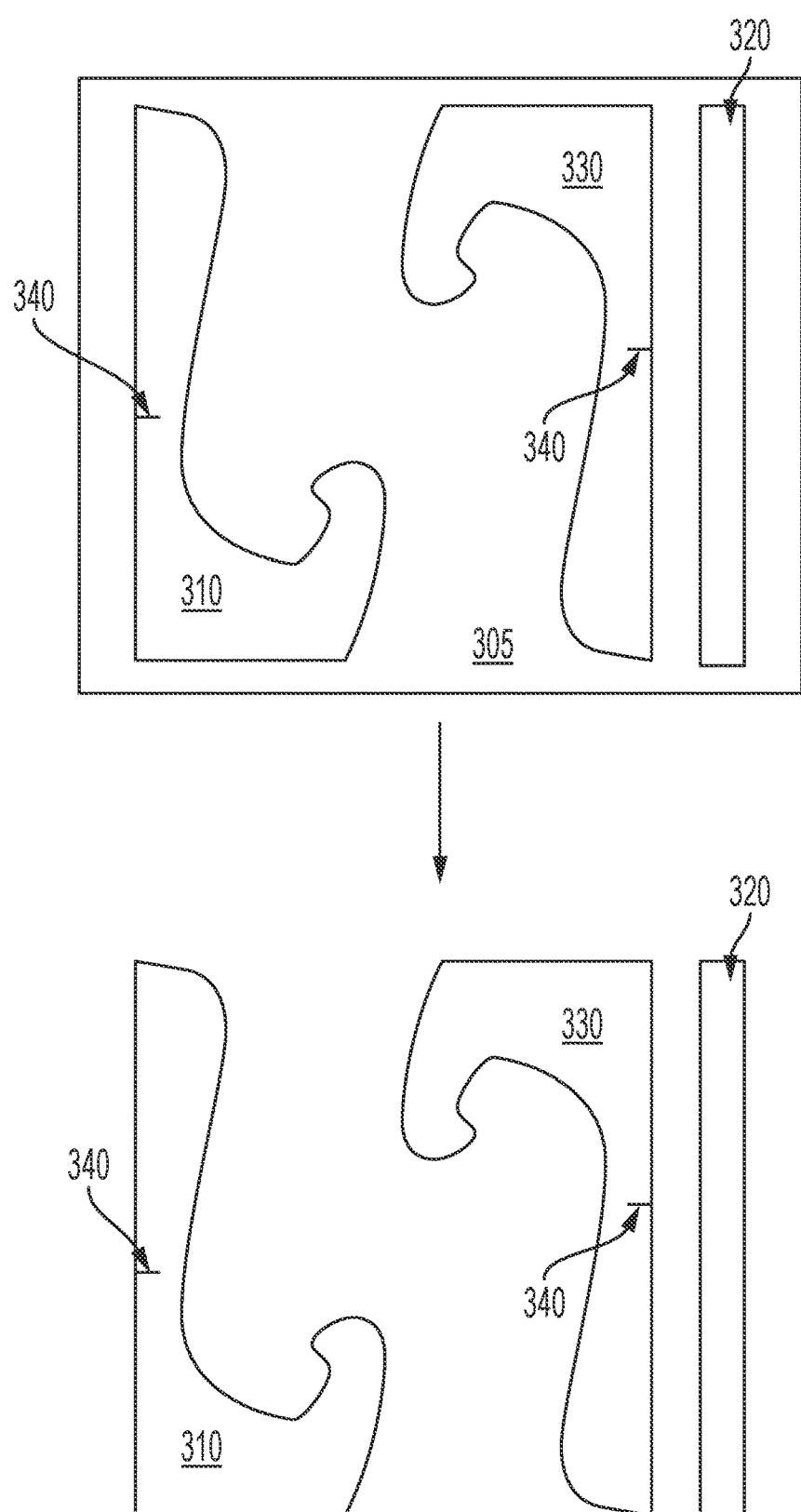
FIG. 11 is a top view of another embodiment of a foldable device holder or system in a flat position, according to one or more examples of the disclosure.
Figure 12:
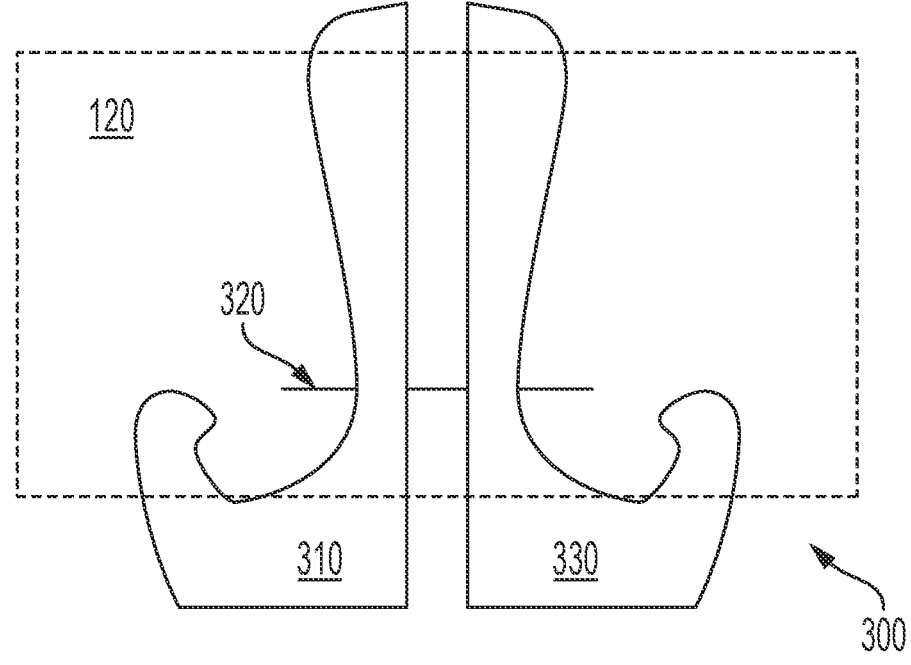
FIG. 12 is a front perspective view of the foldable device holder of FIG. 11 in an assembled position supporting a device, according to one or more examples of the disclosure.

In one or more embodiments, one or more foldable portable device holders and one or more foldable systems and/or methods for displaying printed indicia and/or digital media are provided as illustrated in one or more of the figures submitted here. The systems and methods disclosed herein may comprise at least one foldable portable device holder, such as, for example, a foldable portable device holder 100 (hereinafter "the foldable device holder 100") as shown in FIGS. 1, a foldable portable device holder 200 (hereinafter "the foldable device holder 200") as shown in FIG. 7, or a foldable portable device holder 300 (hereinafter "the foldable device holder 300") as shown in FIGS. 11 and 12.

In some embodiments, the foldable device holder 100, the foldable device holder 200, and/or the foldable device holder 300 (hereinafter collectively referred to as "the foldable device holder 100, 200, 300") may be made from one or more materials and/or composite materials (hereinafter collectively referred to as "at least one material/composite") suitable for receiving printable indicia, codes, and/or labels and assembling or folding to support or hold a portable electronic device, such as, portable electronic device 120 as shown in FIGS. 4B-6B. The portable electronic device 120 may be a electronic smartphone, a electronic tablet, a electronic display, or similar portable computing or electronic device. In some embodiments, the at least one material/composite may be or may comprise a paper-based material, a plastic-based material, and/or a composite paper/plastic-based material. For example, the material or composite can be cardboard or paperboard material, which may or may not be corrugated. The at least one material/composite may be a disposable material or a re-usable material, or a combination thereof. For example, the material can be cardboard, chipstock, e-flute corrugated cardboard, cardstock, plastic-based material, or a combination thereof. In at least one embodiment, the plastic-based material may be a hard plastic material, a soft plastic material, or a combination thereof. For example, the hard plastic material may be polypropylene, polyethylene terephthalate, or a combination thereof and the soft plastic material may be silicone.

The material of foldable device holder 100, 200, 300 can be a sheet material having a thickness of between about 0.0312 inches to 0.25 inches. In some embodiments, the thickness of the material may be dependent on the specific type of material used. For example, a larger thickness may be used for a softer material, but a thinner sheet may be used for a relatively harder material. Foldable device holder 100, 200, 300 can be cut, stamped, pressed, milled, or otherwise formed from the sheet material.

In one or more embodiments, the foldable device holder 100, 200, 300 may be made of a known material that may exhibit at least one anti-microbial property or may be doped or loaded with an anti-microbial component. In some embodiments, the foldable device holder 100, 200, 300 may be completely covered, partially covered, or substantially covered with an anti-microbial film, an anti-microbial coating, an anti-microbial covering, or a combination thereof. As a result, the foldable device holder 100, 200, 300 may be sanitary and suitable for use in the medical and health service industries or for holding electronic devices in rooms where medical applications or procedures are being performed. Additionally, the film, coating, and/or covering may be a waterproof film and/or otherwise protect the foldable device holder 100, 200, 300. In some embodiments, the foldable device holder 100, 200, 300 may be recyclable and/or re-usable and the film, coating, and/or covering may be or may comprise any known sterilization/sanitization coating(s), sterilization/sanitization material(s), or combination thereof. Foldable device holder 100, 200, 300 can be a beverage coaster that is transitionable (as described in greater detail below) from a flat position configured to receive a beverage to a folded position configured to receive a portable electronic device.

Figure 3:
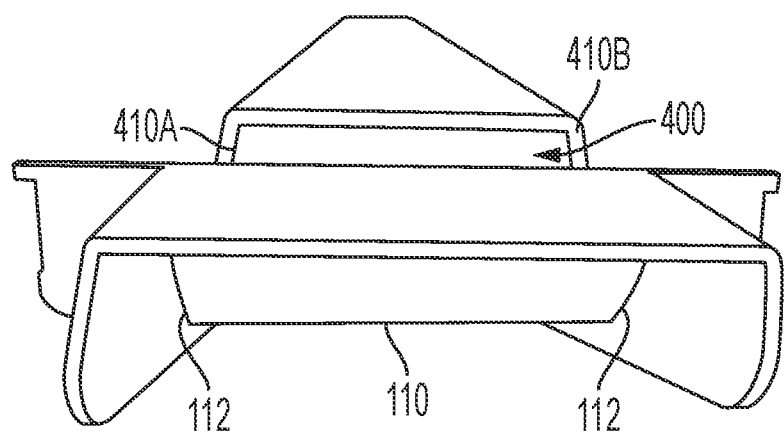
FIG. 3 is a front perspective view of the foldable device holder of FIG. 1 in a folded position, according to one or more examples of the disclosure.
Figure 5A:
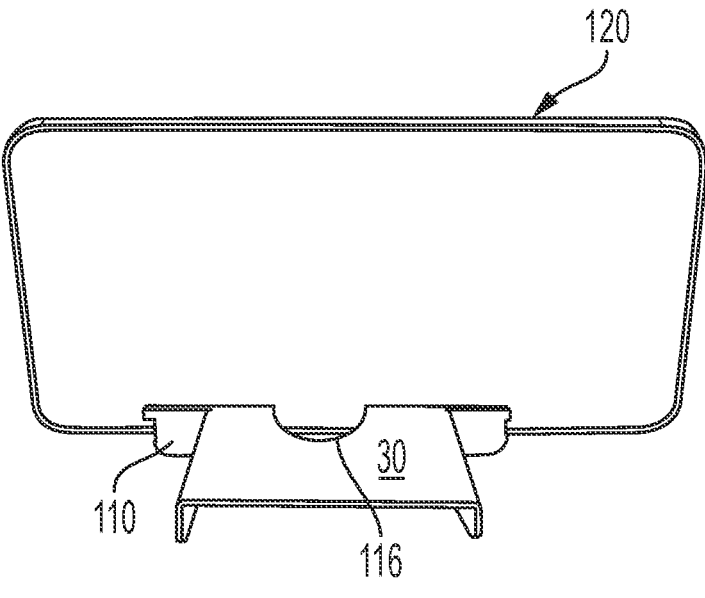
FIG. 5A is a front perspective view of the foldable device holder of FIG. 1 in a folded position supporting a device, according to one or more examples of the disclosure.
Figure 5B:
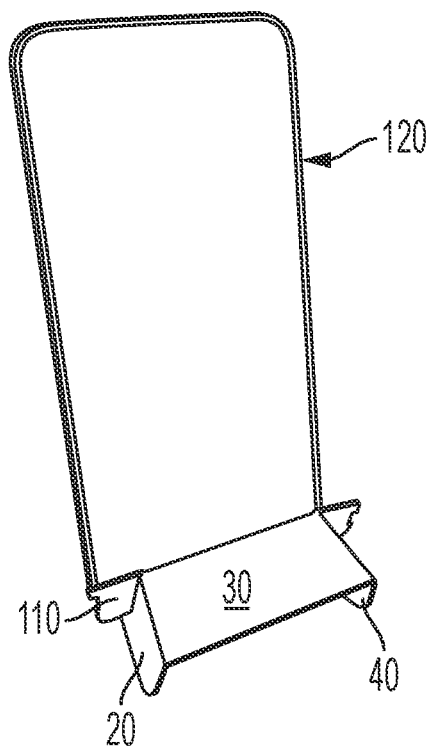
FIG. 5B is a front perspective view of the foldable device holder of FIG. 1 in a folded position supporting a device, according to one or more examples of the disclosure.

Foldable device holder 100 can be a single-piece, foldable object. As shown in FIG. 1, structural features of the foldable device holder 100 may comprise, but are not limited to, one or more of the following: a body made out of a planar sheet material and having at least two dimensions, such as a width 118 and length 119, wherein dimensions 118 and 119 may have the same values, substantially the same values, substantially different values, or different values; a thickness which is not shown in FIG. 3 but is illustrated in other figures submitted herewith; an outer perimeter 12; a plurality of partitions comprising, but not limited to, a first partition 20, a second partition 30, and a third partition 40; one or more hinge lines 80A-C for moving, changing, transforming, and/or folding the foldable device holder 100 from the first or starting position into the second or folded position; a shelf 110 which is configured to hold, support, and/or display a portable device when the foldable device holder 100 is disposed in the second or folded position; at least one curved surface or notch 112 disposed on or along at least one edge 111 of the shelf 110; and/or at least one flat or planar surface 114 disposed on or along at least one edge of the shelf 110. As illustrated in FIG. 1, notches 112 can be cutout in the shape of a circle, but other shapes such as semicircles, diamonds, triangles, rectangles, ovals, or others can be used. Foldable device holder 100 can further include a window 116. In some embodiments, edge 111 of shelf 110 does not include any notches 112 and the shelf 110 is held into place by friction between edge 111 and surfaces 410A-B. Like notches 112, window 116 is illustrated as a circle, but other shapes are possible. Window 116 can permit better viewing of the screen of device 120 when it is held by foldable device holder 100 (e.g., as shown in FIG. 5A). One or more of the window 116 and notches 112 can be cut out completely from the body of foldable device holder 100. In other embodiments, one or more of the window 116 and notches 112 can be perforated, but not completely removed from the body of foldable device holder 100 during manufacturing. Accordingly, the end-user can remove the perforated regions before folding the foldable device holder 100 (as described in greater detail below).

Shelf 110 can take the form of a hinged cutout. Specifically, edge 111 (including notches 112) can be a perforation and/or cut extending completely through the body of foldable device holder 100. The cut or perforation edge may extend around much of the perimeter of the shelf 110, except that the shelf will remain attached to rest of the holder 100 by first hinge line 80C. Accordingly, shelf 110 can be folded along first hinge line 80C, which defines an edge of the hinged cutout. Hinge lines 80A-C can be scored or otherwise formed as a line of relative weakness between portions of foldable device holder 100 that permit the body of foldable device holder 100 to be folded along the hinge line. In some embodiments, one or more of hinge lines 80A-C is perforated. In some embodiments, one or more of the hinge lines 80A-C is formed by an area having a thinner cross section than a cross section of another portion of the foldable device holder. Second and third hinge lines 80A and 80B can define first, second, and third partitions (i.e., partitions 20, 30, 40 of the foldable device holder 100). Partition 30 can define a space between partitions 20 and 40. This space (partition 30) separates second hinge line 80A from third hinge line 80B, increasing the stability of foldable device holder 100 when it is in a folded position.

As described herein, the foldable device holder 100 is configurable between a first position and a second position. The first position of the foldable device holder is a flat, planar position, as shown in FIG. 1. In the flat position, the foldable device holder is easily stacked for convenient storage and transport. Additionally, the first position can permit the foldable device holder to be a beverage coaster (e.g., a flat surface on which a cup, bottle, can, glass, or other beverage container can be placed to protect a surface underneath the coaster). Various printed images can be displayed on the both sides of the foldable device holder and be visible in the flat position.

By folding the foldable device holder 100 along hinge lines 80A and 80B, then along hinge line 80C, foldable device holder 100 can be transitioned in the second position. In the second position the foldable device holder 100 is bent along each of the first, second, and third hinge lines and the hinged cutout forms an area for receiving a device. Specifically, curved surfaces 112 can engage interior edges of partitions 20 and 40 to lock the foldable device holder 100 in the second position. In the second position, the foldable device holder 100 forms a shelf sized and shaped to receive a portable electronic device.

In the first position, foldable device holder 100 have outer dimensions 118 and 119 that are between about 3 inches to about 5.5 inches, or about 4.5 inches. It is understood that the foldable device holder 100 can be constructed with larger or smaller dimensions to be appropriately sized to larger or smaller devices, respectively. When in the first (flat) position foldable device holder 100 can be substantially square in shape (i.e., 118 and 119 are equal or about equal).

Figure 2A:
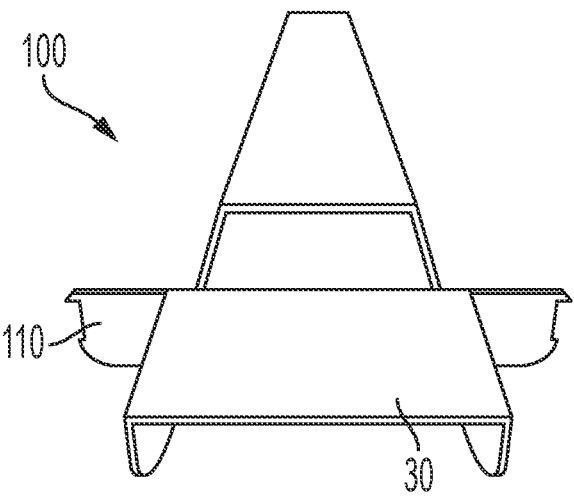
FIG. 2A is a front perspective view of the foldable device holder of FIG. 1 in a folded position, according to one or more examples of the disclosure.
Figure 2B:
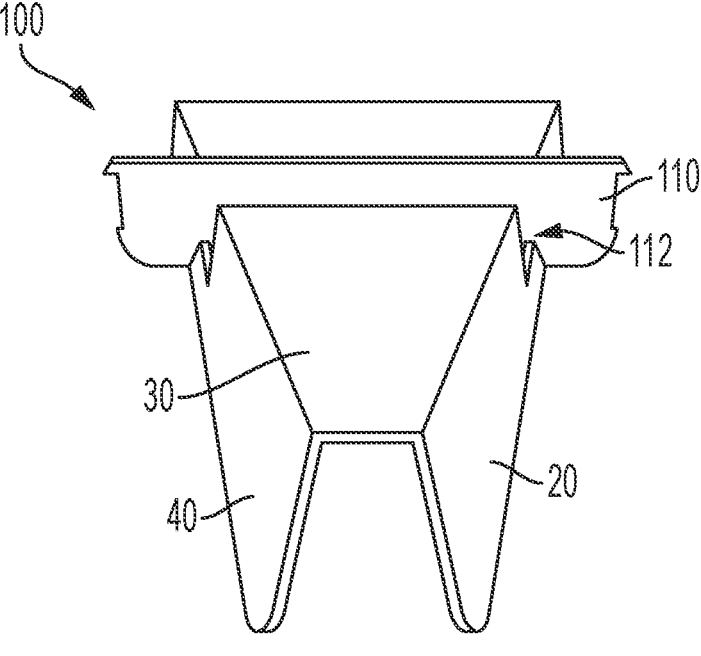
FIG. 2B is a back perspective view of a foldable device holder or system in yet another embodiment, according to one or more examples of the disclosure.
Figure 4A:
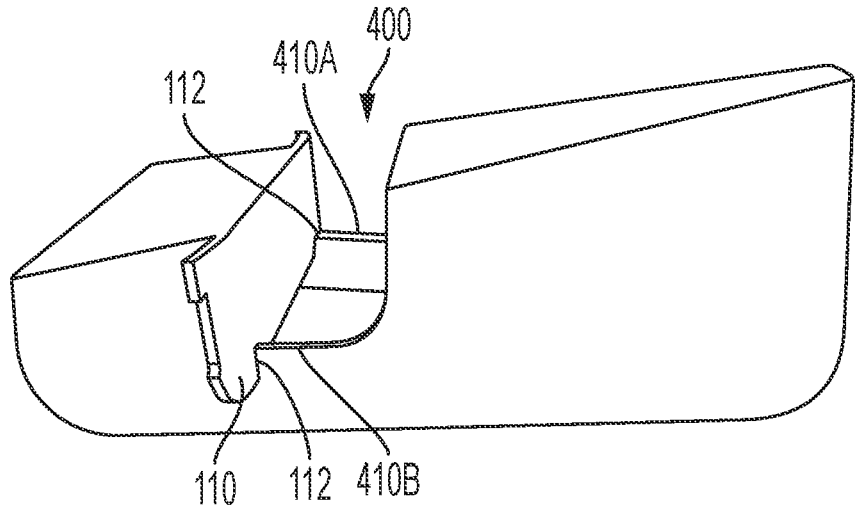
FIG. 4A is a side perspective view of the foldable device holder of FIG. 1 in a folded position, according to one or more examples of the disclosure.
Figure 4B:
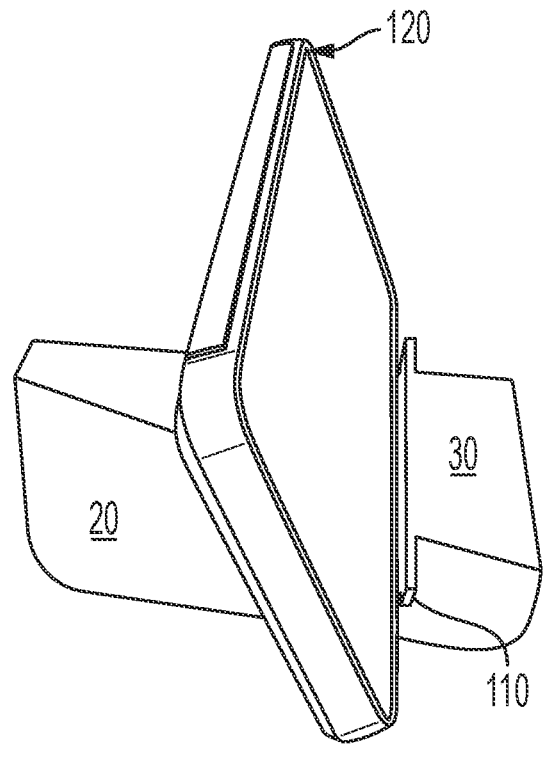
FIG. 4B is a side perspective view of the foldable device holder of FIG. 1 in a folded position supporting a device, according to one or more examples of the disclosure.
Figures 6A, 6B:
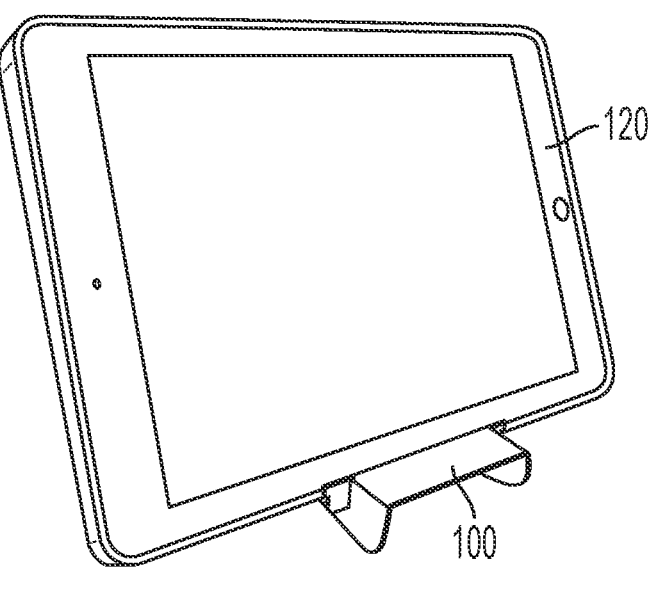
FIG. 6A is a front perspective view of the foldable device holder of FIG. 1 in a folded position supporting a device, according to one or more examples of the disclosure.
FIG. 6B is a back perspective view of the foldable device holder of FIG. 1 in a folded position supporting a device, according to one or more examples of the disclosure.

FIGS. 2A-6B illustrate various views of the foldable device holder 100 in the second folded position. As illustrated in the figures, hinge lines 80A-C may not be parallel. Accordingly, this can permit the holder to take a semi-triangular shape, as illustrated by FIG. 2A-2B. In the second position, the folded shelf 110 forms a region 400 sized and shaped to receive a portable electronic device 120. The portable electronic device 120 can rest on edges 410A-B of partitions 20 and 40, and respectively. As shown in FIG. 4, curved surfaces 112 can engage edges 410A-B (of partitions 20 and 30, respectively) to hold foldable device holder 100 in the second position. Foldable device holder 100 can be sized and shaped to hold portable device 120 in a horizontal configuration (FIG. 5A) or a vertical configuration (FIG. 5B). FIGS. 5A and 5B illustrates foldable device holder 100 holding a smart phone, but as described above foldable device holder 100 can support other larger or smaller devices. For example, FIGS. 6A and 6B illustrate foldable device holder 100 supporting a larger electronic tablet.

As shown in FIGS. 7-10, structural features of the foldable device holder 200 may comprise, but are not limited to, one or more of the following: at least two dimensions selected from 272, 274, and 276, wherein 272, 274 and 276 may be the same dimensions, substantially the same dimensions, substantially different dimensions, or different dimensions; a thickness which is not shown in FIG. 7 but is illustrated in other figures submitted herewith; an outer perimeter 210; a plurality of partitions comprising, but not limited to, a first partition 220, a second partition 230, a third partition 240, and a fourth partition 250; a recess or cutaway portion 260 which may comprise one or more curved or non-planar surfaces 262 and/or one or more flat or planar surfaces 264; at least two fastening means 270a, 270b which may or may not be female/male fasteners; and/or hinge lines 280 for moving, changing, transforming, and/or folding the foldable device holder 200 from the first or starting configuration into the second or folded configuration.

As described above with respect to foldable device holder 100, foldable device holder 200 is configurable between a first position and a second position in a similar manner. The first position of the foldable device holder 200 is a flat, planar position, as shown in FIG. 7. In the flat position, the foldable device holder is easily stacked for convenient storage and transport. Additionally, the first position can permit the foldable device holder 200 to be a beverage coaster (e.g., a flat surface on which a cup, bottle, can, glass, or other beverage container can be placed to protect a surface underneath the coaster). Various printed images can be displayed on the both sides of the foldable device holder 200 and be visible in the flat position.

Figure 8A:
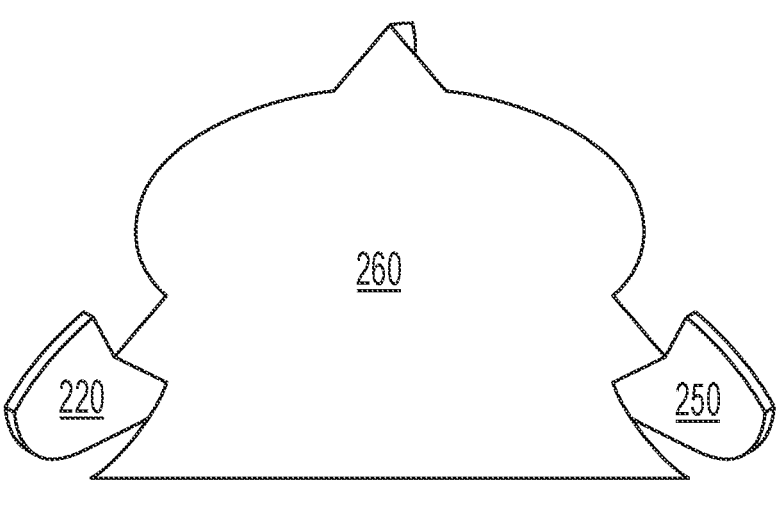
FIG. 8A is a front perspective view of the foldable device holder of FIG. 7 in a folded position, according to one or more examples of the disclosure.
Figure 8B:
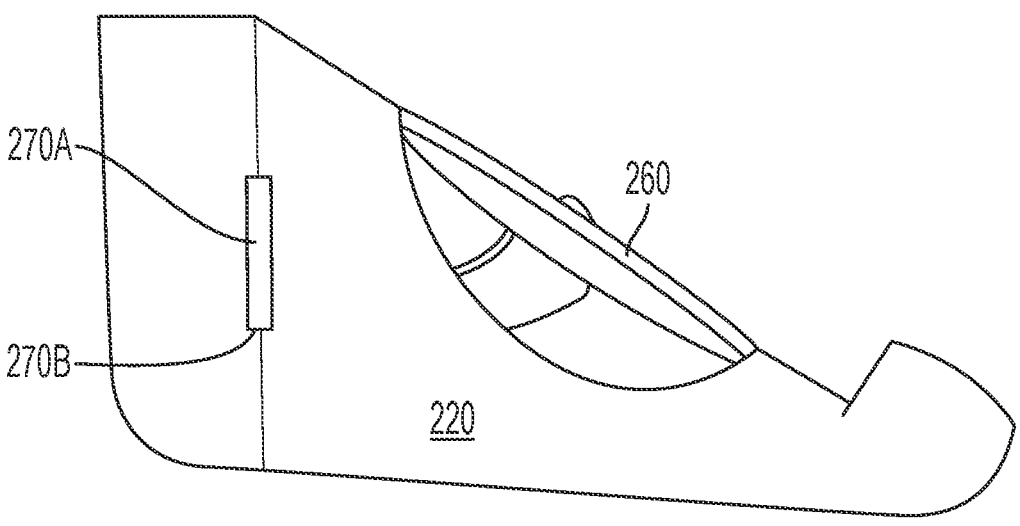
FIG. 8B is a side perspective view of the foldable device holder of FIG. 7 in a folded position, according to one or more examples of the disclosure.
Figure 9:
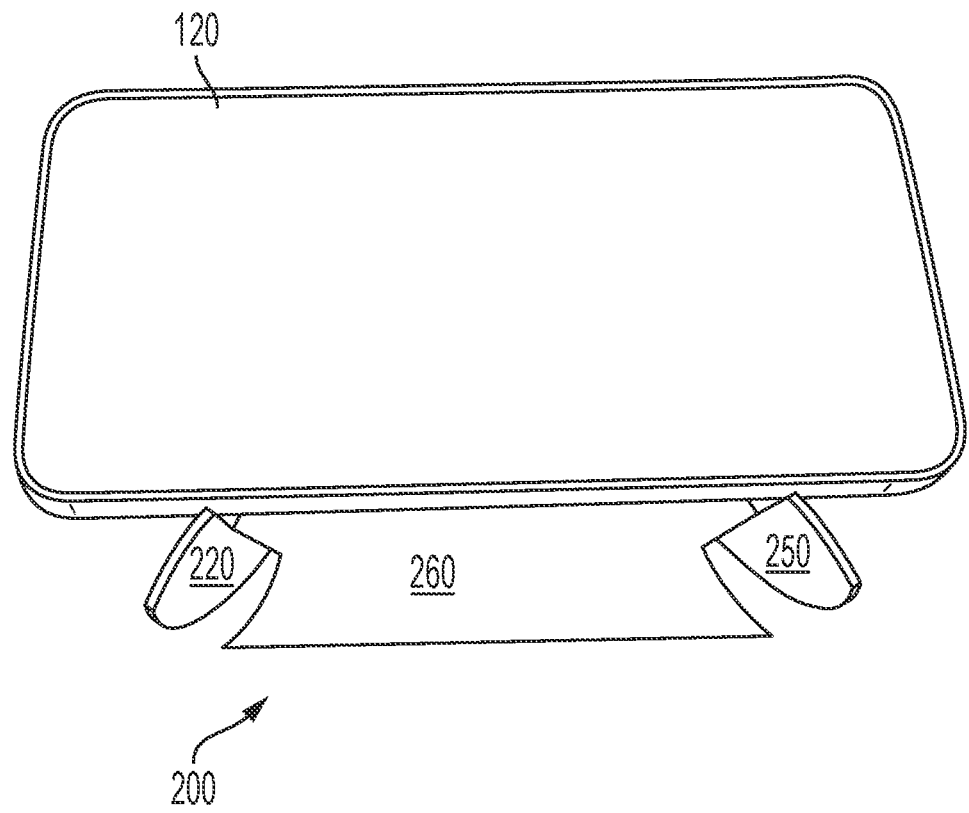
FIG. 9 is a front perspective view of the foldable device holder of FIG. 7 in a folded position supporting a device, according to one or more examples of the disclosure.

By folding the foldable device holder 200 along hinge lines 280, 264, foldable device holder 200 can be transitioned in the second position, which is shown in FIGS. 8A and 8B. In the second position the foldable device holder 200 is bent along each of the hinge lines and tab 270A is inserted into slot 270B (see FIG. 8B) to hold the foldable device holder 200 in the second position. Partition 260 forms an incline that can support a device 120, as shown in FIG. 9. Edges of partitions 220 and 250 can support a bottom edge of device 120, thus forming a shelf sized and shaped to receive device 120.

Figure 10:
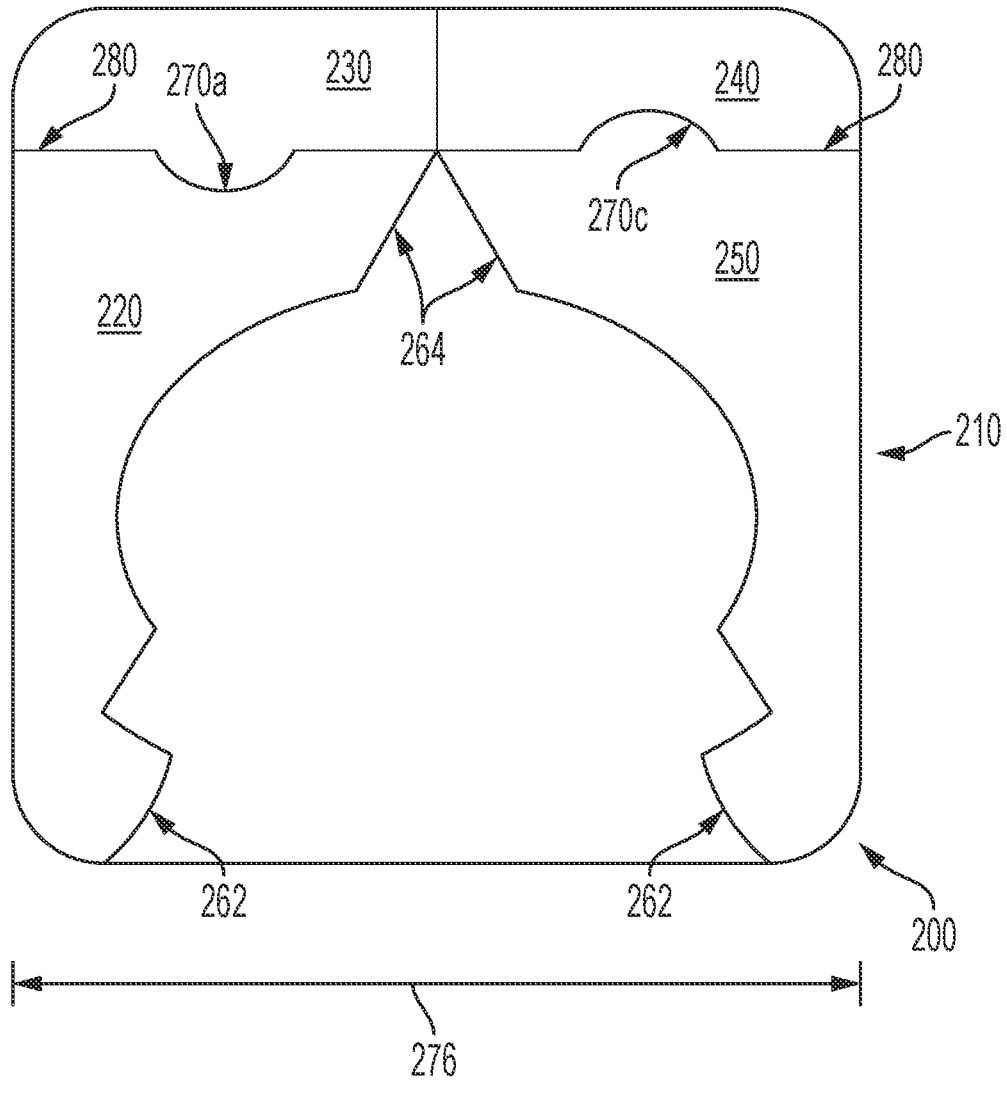
FIG. 10 is a top view of another embodiment of a foldable device holder or system in a flat position, according to one or more examples of the disclosure.

FIG. 10 illustrates an alternative embodiment of foldable device holder 200 that has a tab 270C in place of slot 270 B. Tabs 270A and 270C can engage each other at the holes in panels 230, 240 formed by the opposite tab to hold the foldable device holder 200 in the second position.

As shown in FIGS. 4B, 5A-B, 6A-B, 9, 12, and 15, the portable electronic device 120 may be supported, elevated, held, angled, and/or displayed by at least one foldable device holder 100, 200, 300 that has been configured from a flat or planar first configuration into a folded or 3-dimensional second configuration. In some embodiments, the foldable device holder 100, 200, 300 may comprise or consist of a single-piece made of at least one material/composite that may be folded or self-assembled to support, elevate, hold, angle, and/or display the portable electronic device 120. The foldable device holder 100, 200, 300 provide for dual-purposes or dual uses such that the foldable device holder 100, 200, 300 provide a first purpose or second use when disposed in the flat or planar first configuration and a second purpose or second use when disposed or assembled in the second or folded configuration. In an embodiment, the foldable device holder 100, 200, 300 is a super-slim micro stand that supports, elevates, holds, angles, and/or displays the portable electronic device 120.

In one or more embodiments, one or more portions or components of the foldable device holder 100, 200, 300 may be stamped into an object made of at least one material/composite. In some embodiments, the foldable device holder 100, 200, 300 may be stamped into a card 305 as shown in FIG. 11 or a panel of shipping package, container, or box. In an embodiment, the foldable device holder 100, 200, 300 may be stamped intone or more panels of at least one shipping box, at least one bookmark, at least one coaster, at least one beermat, at least one tablet/laptop case that is be foldable into a tablet/laptop stand, at least one medical or at least magnetic screen cover-type case for a tablet/laptop, or a medical-related or health service-related shipping system or box and/or a medical-related or health service-related instruction manual or card that is foldable to support or display the portable electronic device 120.

The card 305 may comprise a first leg 310, an arm 320, and a second leg 330 that are removed from the card 305 to assemble the foldable device holder 300. The first leg 310 and the second leg 330 may have slits 340 provided or formed therein such that the arm 320 may be disposed within or inserted into the slits 340 to assemble the foldable device holder 300 as shown in FIG. 12. After the foldable device holder 300 is assembled the portable electronic device 120 may be supported, elevated, held, angled, and/or displayed by a plurality of surfaces provided by first leg 310, the second leg 330, or a combination thereof as shown in FIG. 12.

Figure 13:
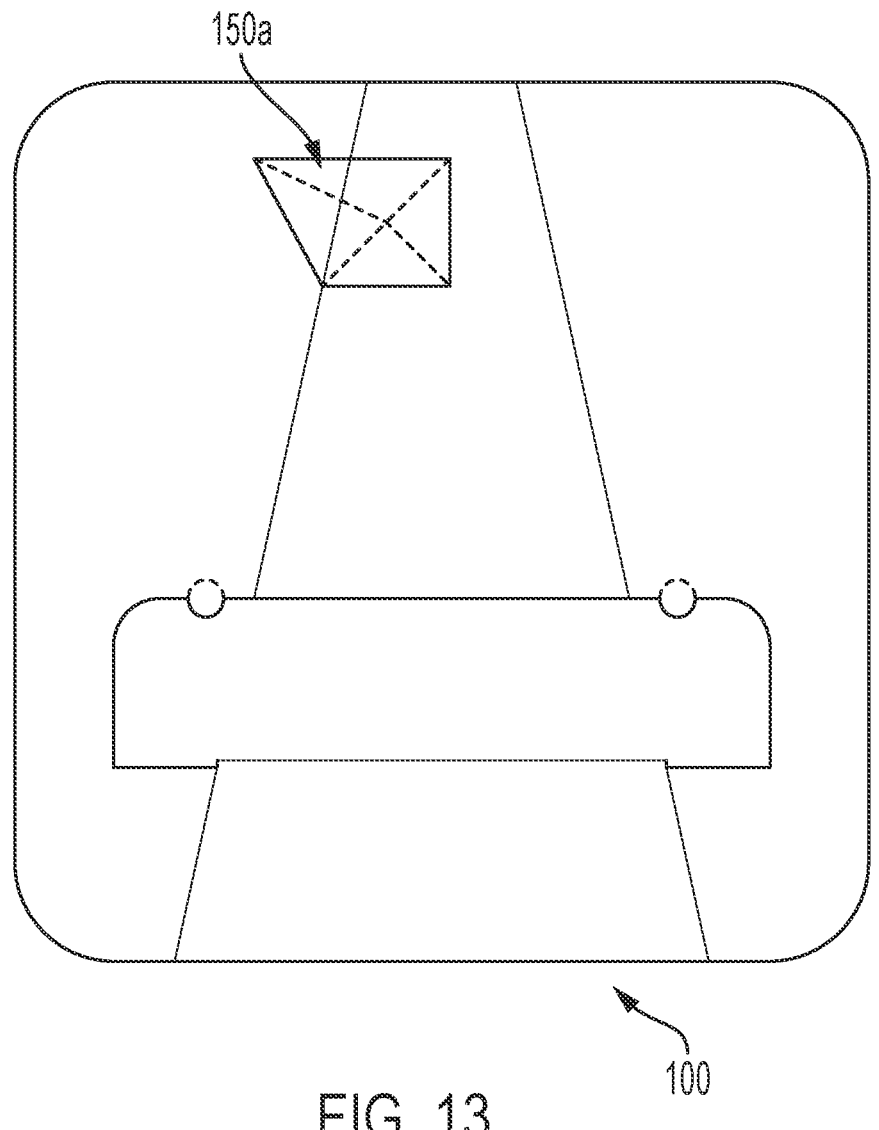
FIG. 13 is a top plan view of a foldable device holder or displaying a printed code or label in a first configuration, according to one or more examples of the disclosure.
Figure 14:
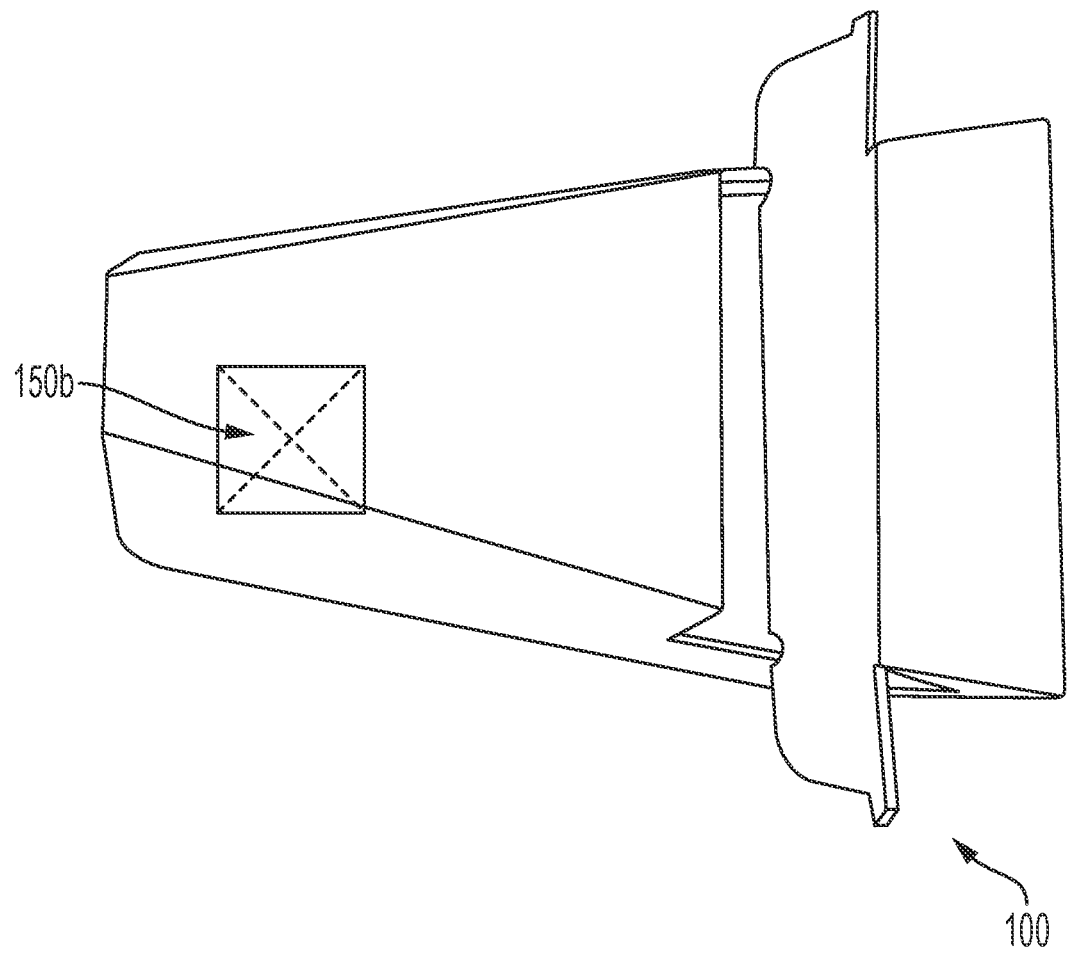
FIG. 14 is a top perspective view of the assembled foldable device holder, as shown in FIG. 13, displaying the printed code or label in a second configuration, according to one or more examples of the disclosure.
Figure 15:
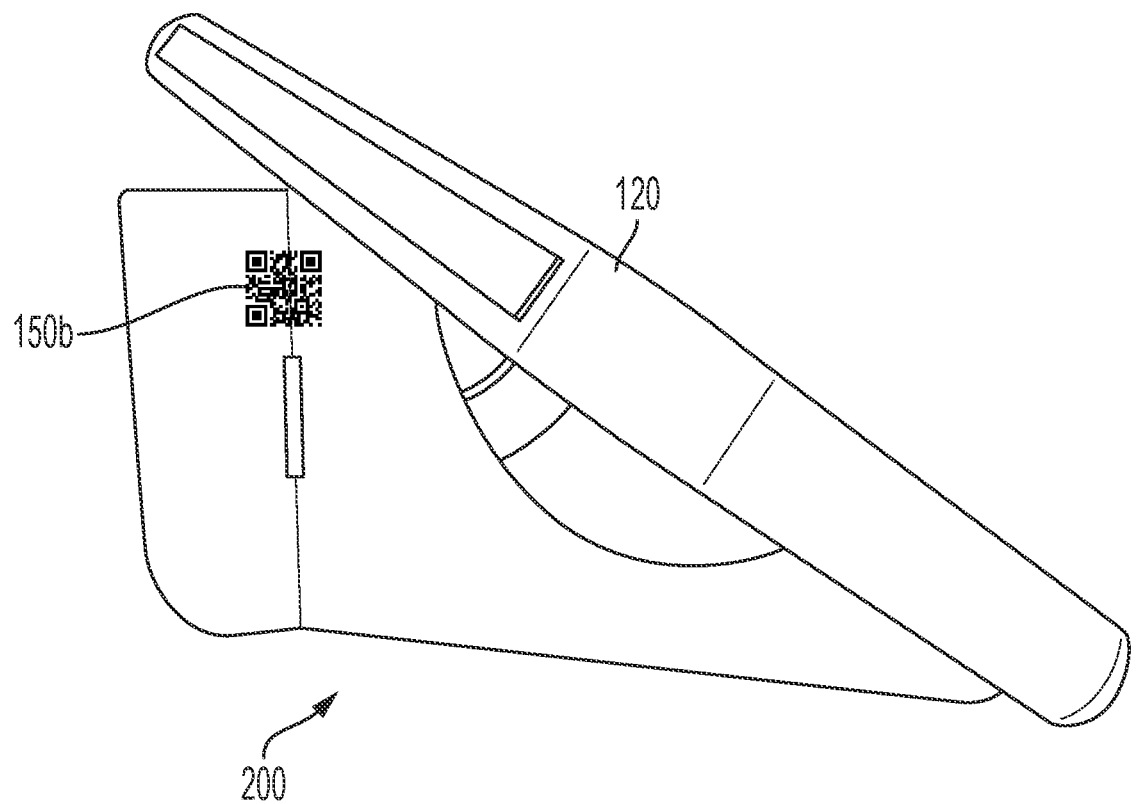
FIG. 15 is a side perspective view of an assembled foldable portable device holder supporting a device and displaying a printed code or label in a second configuration, according to one or more examples of the disclosure.
Figure 16:
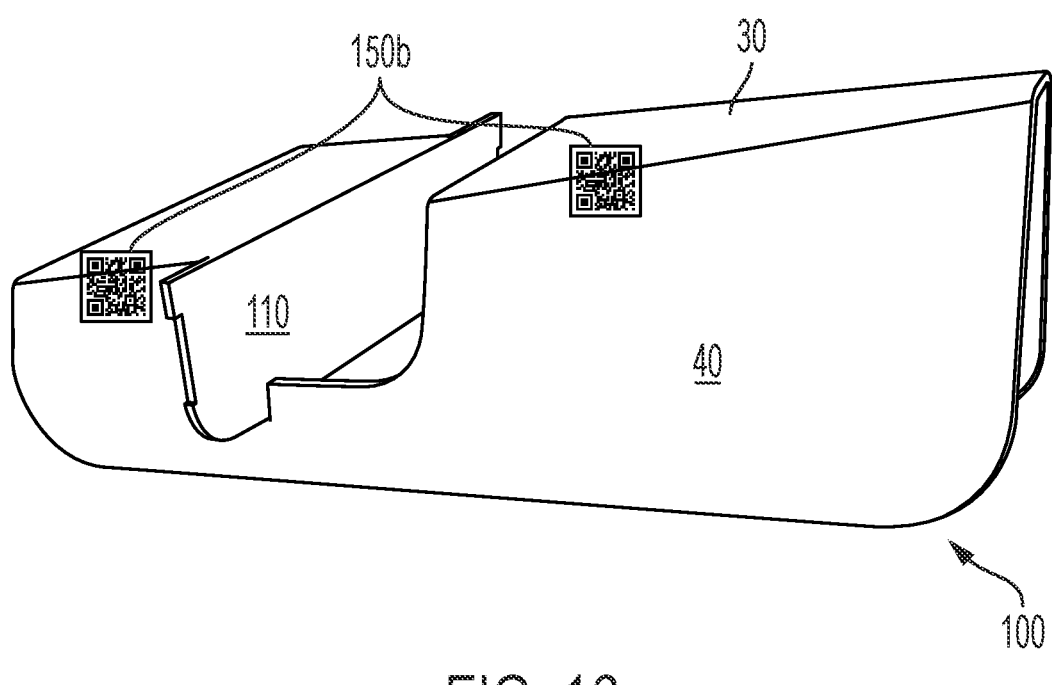
FIG. 16 is a side perspective view of an assembled foldable device holder supporting a device and displaying a printed code or label in a second configuration, according to one or more examples of the disclosure.
Figure 17:
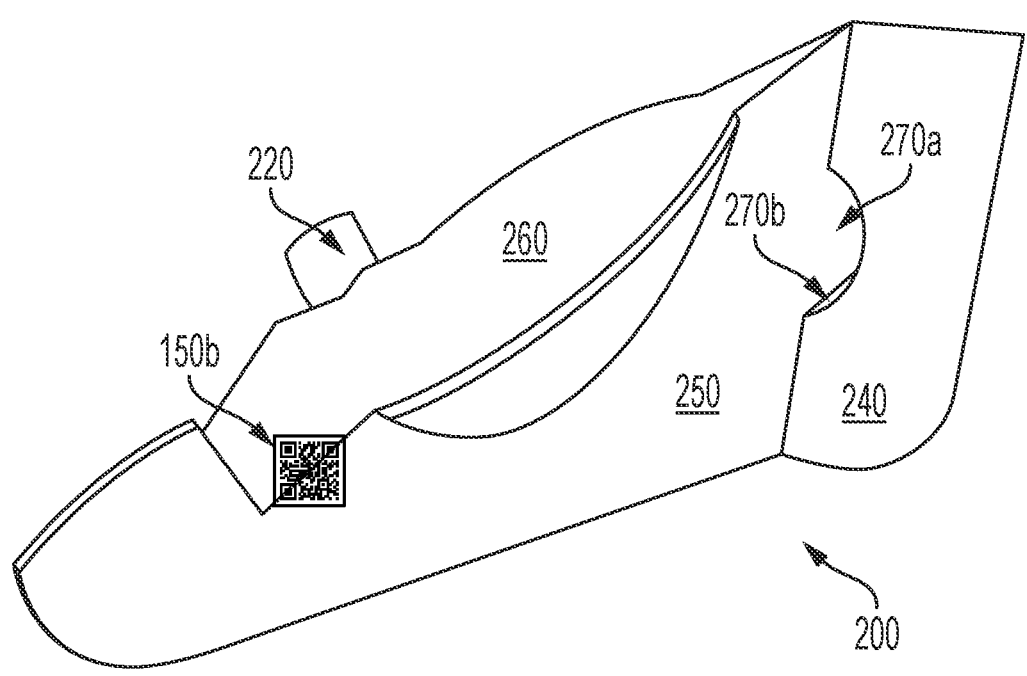
FIG. 17 is a side perspective view of an assembled foldable device holder supporting a device and displaying a printed code or label in a second configuration, according to one or more examples of the disclosure.
Figure 18:
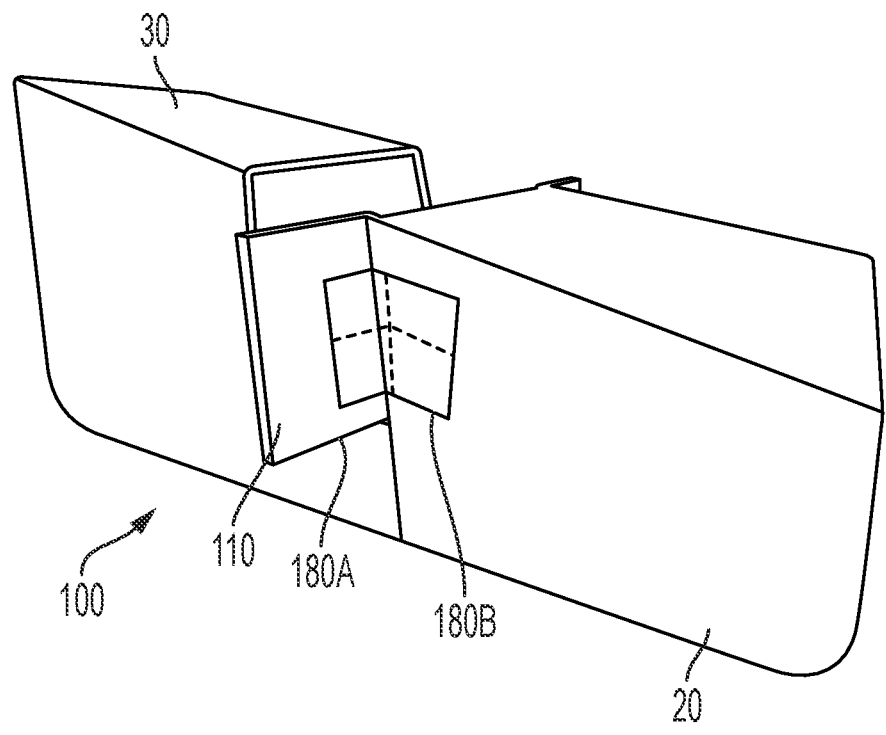
FIG. 18 is a side perspective view of an assembled foldable device holder supporting a portable device and displaying a printed code or label in a second configuration, according to one or more examples of the disclosure.

In one or more embodiments, the foldable systems (i.e., the foldable device holder 100, 200, 300) and methods disclosed herein may be adapted to or configured to hold, support, or display portable devices and display printed indicia and/or digital media. The printed indicia may be displayed on one or more surfaces of the foldable device holder 100, 200, 300 and/or the digital media may be displayed or rendered by the portable electronic device 120. In some embodiments, the printed indicia may comprise at least one print logo, at least one brand trademark, at least one label or code in machine-readable form, or a combination thereof. In an embodiment, the printed indicia in machine-readable form 150b, as shown in FIGS. 14-17, may be a scannable barcode, two-dimensional barcode, matrix barcode, a quick response code (hereinafter "QR" code), or a combination thereof. The printed indicia in machine-readable form 150b may be scanned, recognized, and/or identified by the portable electronic device 120 such that the portable electronic device 120 displays and/or renders digital media that is indicative or associated with the printed indicia in machine-readable form 150b. In some embodiments, the printed indicia in machine-readable form may be printed and/or assembled code or label that is recognizable by the portable electronic device 120 and the portable electronic device 120 may be a mobile and/or handheld device. In some embodiments, the printed indicia in machine-readable form 150b is assembled and/or displayable by moving, changing, and/or folding the foldable device holder 100, 200, 300 from the flat or planar first configuration to the second or folded configuration. In the flat or planar first configuration, the foldable device holder 100, 200, 300 is flat, planar, and/or unfolded and unreadable printed indicia 150a is displayed one or more surfaces of the foldable device holder 100, 200, 300 as shown in FIG. 13. As the foldable device holder 10, 100, 200 is assembled or folded from the flat or planar first configuration into the folded or 3D second configuration, the foldable device holder 100, 200, 300 becomes non-planar, three-dimensional, or folded for holding, supporting, or displaying the portable electronic device. As a result, the unreadable printed indicia 150a changes, transforms, and/or distorts from an unreadable code into the printed indicia in machine readable form 150b as shown in FIG. 14. FIGS. 15-17 illustrate further examples of printed indicia on foldable device holder 100, 200. Printed indicia can be provided that spans across multiple partitions, such as partitions 20 and 30 or 30 and 40. As another example, printed indicia can be provided that is presented in a first part 180A on one surface and in another part 180B on another surface, such as shelf 110 and partition 20, as illustrated in FIG. 18.

In some embodiments, the unreadable printed indicia 150a and the printed indicia in machine readable form 150b is anamorphic image, such as an anamorphic media, an anamorphic code, and/or an anamorphic advertisement that is only assembled, completed, and/or visible when the foldable device holder 100, 200, 300 is disposed in the folded or 3D second configuration. For example, foldable device holder 100, 200, 300 can include an anamorphic image that appears distorted to a user when the foldable device holder is in the first flat position and appears undistorted when the foldable device holder is in the second folded position. Such anamorphic images can appear in any suitable location on foldable device holder 100, 200 (e.g., anywhere there is a hinge, or two surfaces that move relative to each other during the transition between the first flat position and the second folded position. For example, an anamorphic image can be provided that spans across multiples, such as partitions 20 and 30 or 30 and 40 (see FIGS. 14-16). As another example, an anamorphic image can be provided that is presented in a first part 180A on one surface and in another part 180B on another surface, such as shelf 110 and partition 20, as illustrated in FIG. 18.

In some embodiments, the anamorphic media may comprise scannable code that corresponds to a video advertisement, a marketing video, an entertainment video, an instructional video, a video indicative of a product or device assembly, a view indicative of a method, process, or procedure, or a combination thereof. In some embodiments, the video indicative of a product or device assembly and/or a method, process, or procedure may provide instructional information to a medical or healthcare provider and/or may relate to at least one medical product or device or at least one medical-related method, process, or procedure, or a combination thereof. Once the printed indicia in machine readable form has been scanned by at least one optical scanner and/or at least one digital camera of the portable electronic device 120, the media corresponding to the anamorphic image may be displayed or rendered via at least one electronic display or screen and/or at least one audio speaker of the portable electronic device 120.

Figures 19A, 19B:
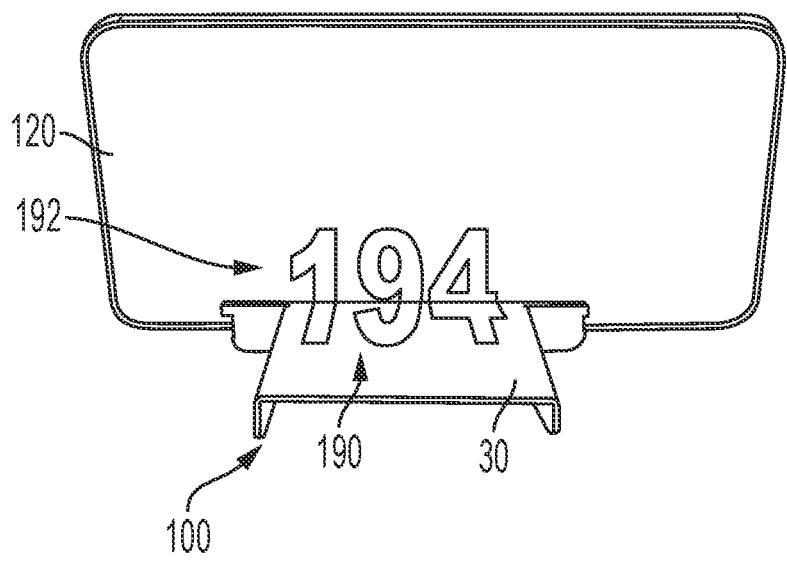
FIG. 19A is a front perspective view of the foldable device holder having a partial image, according to one or more examples of the disclosure.
FIG. 19B is a front perspective view of a foldable device holder having a partial image, according to one or more examples of the disclosure.

Referring to FIG. 19A, the foldable device holder 100 can include a portion of an image that is completed by an image displayed on portable device 120. For example, when in the second position, a portion of the foldable device holder 100, can include a first part of an image that is located such that when a device displaying a second part of the image is placed on the shelf, the first part of the image and the second part of the image together present a complete view of the image. For example, as shown in FIG. 19A, partition 30 of foldable device 100, can include a first image portion 190. When the use navigates to a particular website or application (for example, by scanning a code presented on foldable device holder 100, as described above), the website or application may cause a second image portion 192 to be displayed on portable device 120. The second image portion 192 can correspond to first image portion 190 such that when portable device 120 is placed on foldable device holder 100 in a certain orientation, together the first image portion 190 and second image portion 192 form a complete image that is viewable by a user. In the example of FIG. 19A, first image portion 190 and second image portion 192 together form an image that shows an alpha-numeric code, in this case the numerals "194." This alpha-numeric code (or any other image or code produced in such a multi-part manner) could correspond to a discount code, a scannable code (e.g., a QR code), prize code, access code, or other message, image, advertisement, logo, or the like.

Referring to FIG. 19B, foldable device holder 200 can similarly include a portion of an image that is completed by an image displayed on portable device 120. The second image portion 196 can correspond to first image portion 194 such that when portable device 120 is placed on foldable device holder 200 in a certain orientation, together the first image portion 194 and second image portion 196 form a complete image that is viewable by a user. In the example of FIG. 19B, first image portion 194 and second image portion 196 together form an image that shows an alpha-numeric code, "27D".

The various embodiments disclosed in this patent document provide advantages over the prior art, whether standalone or combined. For example, the disclosed embodiments provide a multi-use device holder that in one position can serve as a beverage coaster or similar mat or surface protector, but that can be quickly and easily transitioned into a second position for supporting a mobile device. The disclosed embodiments also provide unique advertising and interaction capabilities through the use of anamorphic images or partial images.

Other advantages of the present invention can be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described in this document, but is intended to include all changes and modifications that are within the scope and spirit of the invention as defined in the claims

What is claimed is:

1. A foldable device holder comprising:
a body comprising a sheet material;
a hinged cutout;
a first hinge line defining a first edge of the hinged cutout;
a second hinge line; and
a third hinge line;
a first partition defined between a first edge and the second hinge line;
a second partition defined between a second edge and the third hinge line;
a third partition defined between the second hinge line and the third hinge line;
wherein:
the foldable device holder is configurable between a first position and a second position;
the foldable device holder comprises at most three hinge lines;
none of the first, second, and third hinge lines are parallel to each other;
the third partition comprises a window;
when in the first position the foldable device holder is flat;
when in the second position:
the foldable device holder is bent along each of the first, second, and third hinge lines,
the hinged cutout forms a region configured to receive a portable electronic device, and
the hinged cutout engages the first partition and the second partition to hold the foldable device holder in the second position; and
the window is positioned near the hinged cutout such that when the foldable device holder is in the second position and the portable electronic device is placed in the foldable device holder, the window exposes a portion of a screen of the portable electronic device.

2. The foldable device holder of claim 1, wherein at least one of the hinge lines is formed by an area having a thinner cross section than a cross section of another portion of the foldable device holder.

3. The foldable device holder of claim 1, wherein the second and third hinge lines define the first, second, and third partitions of the foldable device holder.

4. The foldable device holder of claim 3, wherein the hinged cutout comprises a second edge having a first notch and a second notch.

5. The foldable device holder of claim 4, wherein when the foldable device holder is in the second position, the first notch engages the first partition and the second notch engages the second partition.

6. The foldable device holder of claim 5, wherein the third partition defines a space between the first partition and the third partition.

7. The foldable device holder of claim 6, wherein the third partition is positioned such that a first part of an image located on the third partition forms a complete view of the image when combined with a second part of the image displayed by a device held by the foldable device holder.

8. The foldable device holder of claim 1, wherein when the foldable device holder is in the first position, the foldable device holder has an outer dimension between about 3 inches and about 5.5 inches.

9. The foldable device holder of claim 1, wherein the foldable device holder comprises at least one of a cardboard material, paperboard material, chipstock, corrugated material, plastic-based material, or a composite material.

10. The foldable device holder of claim 1, wherein the foldable device holder is coated or impregnated with an antimicrobial agent.

11. The foldable device holder of claim 1, further comprising an anamorphic image that appears distorted to a user when the foldable device holder is in the first position and appears undistorted when the foldable device holder is in the second position.

12. The foldable device holder of claim 10, wherein the anamorphic image is a scannable code.

13. The foldable device holder of claim 1, wherein the window extends into the hinged cutout.

14. The foldable device holder of claim 1, wherein when in the first position, the foldable device holder is substantially square in shape.

15. The foldable device holder of claim 1, wherein the third partition is substantially flat when the foldable device holder is either of the first position or the second position.

16. The foldable device holder of claim 15, wherein the third partition is configured to support the portable electronic device at an angle.

* * * * *